United States Patent [19]

Yamamoto et al.

[11] Patent Number: 5,142,500
[45] Date of Patent: Aug. 25, 1992

[54] NON-DESTRUCTIVE METHOD OF MEASURING PHYSICAL CHARACTERISTICS OF SEDIMENTS

[75] Inventors: Tokuo Yamamoto; Altan Turgut, both of Miami, Fla.

[73] Assignee: Kawasaki Steel Corporation, Japan

[21] Appl. No.: 610,563

[22] Filed: Nov. 8, 1990

[51] Int. Cl.$^5$ ............................................. G01V 1/00
[52] U.S. Cl. .................................... 367/57; 367/912; 181/112
[58] Field of Search ............................ 367/25, 28–32, 367/56–58, 911, 912; 181/102–106, 112

[56] References Cited

U.S. PATENT DOCUMENTS

| | | | |
|---|---|---|---|
| 3,909,776 | 9/1975 | Broding et al. | 181/106 X |
| 4,214,226 | 7/1980 | Narasimhan et al. | 367/27 |
| 4,524,432 | 6/1985 | Johnson | 367/25 |
| 4,686,660 | 8/1987 | Gjestrum et al. | 367/153 |
| 4,701,891 | 2/1988 | Castagna et al. | 367/31 |
| 4,789,968 | 12/1988 | Rice | 367/25 X |
| 4,807,199 | 2/1989 | Yamamoto et al. | 367/15 |
| 4,813,028 | 3/1989 | Liu | 367/31 |
| 4,843,597 | 6/1989 | Gjessing et al. | 367/15 |
| 4,875,197 | 10/1989 | Rietsch | 367/32 |
| 4,890,487 | 1/1990 | Dussan et al. | 73/152 |
| 4,942,557 | 7/1990 | Seriff | 367/15 |
| 4,951,264 | 8/1990 | Yamamoto | 367/15 |

OTHER PUBLICATIONS

"Measurements of acoustic wave velocities and attenuation in marine sediments", A. Turgut and T. Yamamoto, J. Acoust. Soc. Am., 87 (6), Jun. 1990, pp. 2376–2383.

"Synthetic seismograms for marine sediments and determination of porosity and permeability", A. Turgut and T. Yamamoto, Geophysics, vol. 53, No. 8 (Aug. 1988), pp. 1056–1067.

Primary Examiner—Brian S. Steinberger
Attorney, Agent, or Firm—Austin R. Miller

[57] ABSTRACT

A non-destructive method of measuring physical characteristics of sediments to obtain a cross-sectional distribution of porosity and permeability values and variations, and of shear modulus and shear strength. A pair of boreholes have borehole entries spaced apart from each other at a predetermined distance, and a plurality of hydrophones are spaced at predetermined known positions. A source of seismic energy is placed into another borehole and activated to transmit seismic wave energy from the source to the hydrophones. Seismic wave characteristics are measured in a multiplicity of paths extending from the source to the hydrophones, using cross-bore hole tomography.

16 Claims, 4 Drawing Sheets

NON-DESTRUCTIVE METHOD OF MEASURING PHYSICAL CHARACTERISTICS OF SEDIMENTS

This invention relates to a non-destructive method of measuring physical characteristics of sediments, particularly marine sediments, in order to obtain a cross section distribution of porosity and permeability values and variations of the sedimentary material, and of shear modulus and shear strength as well. More particularly, this invention relates to the use of acoustic transmission in saturated sediments, and evaluating the propagation velocity and attenuation of acoustic waves as a basis for measurement. The invention further relates to the remote determination of porosity and permeability, and of shear modulus and shear strength in marine sediments, by using measured compressional and shear wave characteristics.

PRIOR ART

In our report entitled "Synthetic Seismograms for Marine Sediments and Determination of Porosity and Permeability", Geophysics, Volume 53, No. 8 (Aug., 1988), Pages 1056-1057, we presented numerical simulations of vertical seismic profiles of marine sediments. Vertical seismic profiling of the type referred to in that report has considerable use in the search for placer deposits, resolving problems of engineering geology and the construction of hydro-technical projects. In typical vertical seismic profiling, studies of marine sediments were conducted using high powered electrical sources, and the usable frequency range in such work has been found to be from about 100 Hz to 2000 Hz, whereby penetrations in the marine sediments could be achieved over a distance of more than a thousand meters.

Using a single borehole, vertical seismic profiling was described in the aforesaid report as a series of tests in which both the source and the receiver of the seismic energy were positioned in the same borehole. Such a relationship has produced results of considerable interest, all as described in detail in the aforementioned report.

Useful results, both theoretical and practical, may be obtained by the use of vertical seismic profiling as referred to in the above identified report. Spectral ratio calculations on synthetic examples using Biot's theory and the results obtained by the vertical seismic profiling method can be used to determine the porosity and permeability of marine sediments. However, it is highly desirable to obtain more accurate determinations of physical characteristics of sediments, particularly to obtain an accurate cross-sectional distribution of porosity and permeability values and variations of the sediment.

OBJECTS OF THE INVENTION

Accordingly, it is an object of this invention to provide a novel and highly accurate non-destructive method of measuring physical characteristics of sediments, particularly to obtain accurate cross sectional distributions of porosity and permeability values and variations.

Still another object of the invention is to obtain accurate evaluations of porosity and permeability by acoustic tomography.

Yet another object is to provide a novel method for determining shear modulus and shear strength of sediments, and to determine accurately the existence of hydrocarbons such as oil and gas in the sediments.

Other important objects and advantages of this invention will further become apparent hereinafter, and in the drawings, of which:

DRAWINGS

Figure 4A:
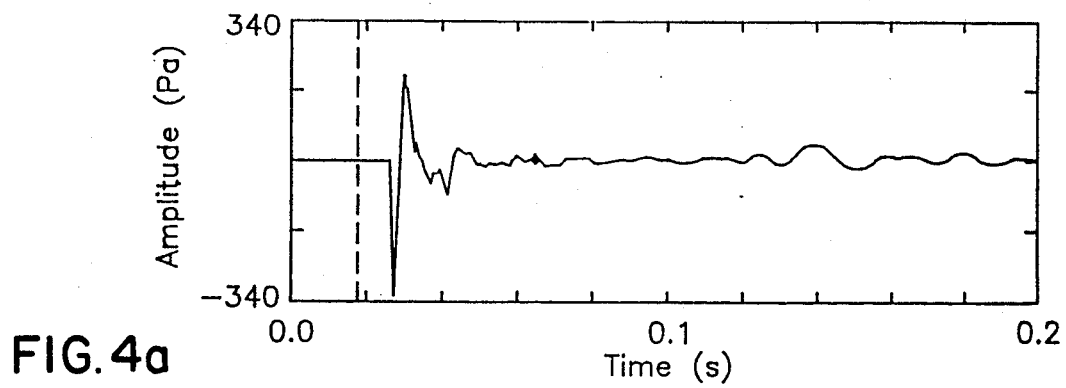
Figure 4B:
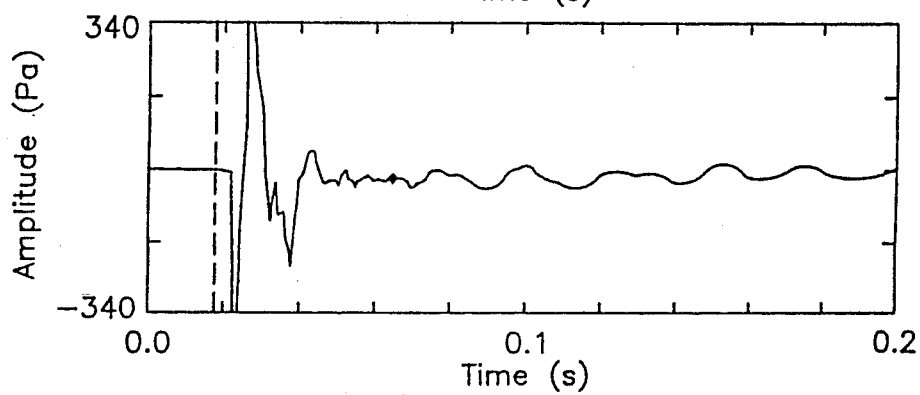
Figure 4B:
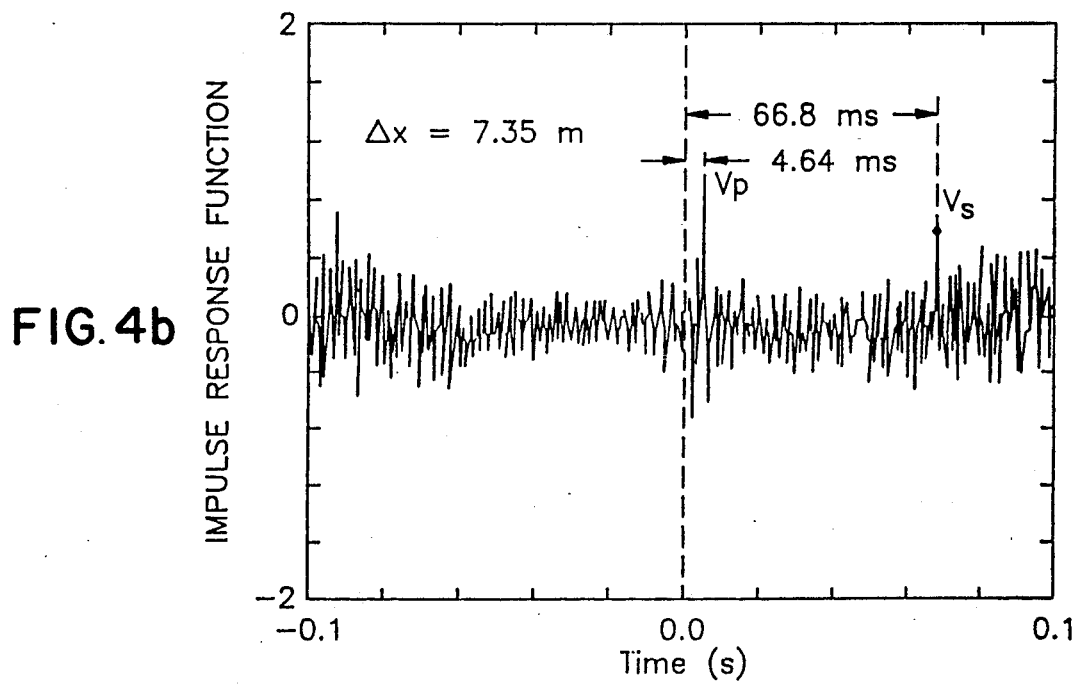

FIGS. 4(a) and 4(b) are graphs showing (a) actual seismic traces recorded by two hydrophones and (b) the impulse response function of the two signals, using a single-tip sparker as the source.

DESCRIPTION OF THE INVENTION

It has now been discovered that it is important to obtain measurements of sedimentary porosity and permeability on the basis of velocity measurements by propagating seismic energy signals directly from source to receiver, and that performing these measurements by direct cross-bore tomography produces much more accuracy and clarity and more reliable results as compared to receiving and analyzing echoes rebounded by vertical seismic profiling from various layers in the marine sediments.

As distinguished from making a vertical seismic profile with the use of a single borehole source and a receiver in the same borehole, in accordance with this invention a cross-hole method is used wherein seismic energy is projected between two or more vertical boreholes spaced apart from each other. In accordance with a preferred embodiment of this invention a multiplicity of spaced hydrophones, deployed at known positions on the seismic surface and in a borehole of known position, serve as the receivers. The source of the seismic energy is preferably a piezo electric ceramic transducer, otherwise referred to as a sparker, which is positioned at a known position in another borehole spaced apart from the borehole containing the hydrophones. By carefully controlling the nature of the energy propagated by the piezo electric ceramic transducer it is possible to dictate the shape of the transmission and to obtain repeatability in a succession of tests. Accordingly, after making a succession of tests by propagating wave energy from the sparker to a multiplicity of hydrophones the sparker can be moved, usually raised or lowered, to a new position in the sparker borehole, in order to propagate repeated waves in order to obtain a multiplicity of test results, all from different angles in relation to each other. In view of the fact that the piezo electric ceramic transducer can produce a wave energy of a known and repeatable shape, comparisons between successive tests are meaningful and provide accurate data for the purpose of analyzing the cross sectional distribution of porosity and permeability values in the sedimentary material.

Accordingly, in accordance with this invention, we have provided a non-destructive method of measuring physical characteristics of sediments to obtain a cross sectional distribution of porosity and permeability values and variations, by forming at least a pair of boreholes having borehole entries that are spaced apart from each other at a predetermined distance. The boreholes extend at least to known depths from the sediment surface, and contain a plurality of hydrophones spaced at predetermined positions within the borehole and also along the sediment surface. A source of seismic energy, such as a piezo electric ceramic transducer, is placed into another borehole at a known position with respect to the hydrophones, and the source is activated to transmit seismic wave energy from the source to all of the hydrophones. By measuring the seismic wave characteristics and paths directly transmitted between the source and the hydrophones, in a multiplicity of paths extending from the position of the source to the positions of the hydrophones, significant measurements may be made in regard to wave velocity. Further, by moving the source to another known position within the source borehole and again activating the source, further seismic wave characteristics measurements can be made on a multiplicity of new paths extending to the hydrophones. By combining the results of such series of measurements it is possible to obtain an accurate and reliable cross sectional distribution of porosity and permeability values and variations in the sedimentary materials. The results, obtained by propagating and receiving signals directly, and not relying upon an echo from various sedimentary layers, produces far more reliable results than the vertical method. Further, in the vertical method, it is necessary to know the depth of the particular sedimentary layer in order to conduct tests producing meaningful results.

In accordance with this invention it is important that we are now able to obtain reliable porosity and permeability results from direct velocity measurements using the attenuation of sound to obtain excellent permeability readings. This is of practical importance in regard to resolving ground water problems, in oil field exploration and elsewhere. Porosity determination according to this invention is especially beneficial in the case of oil field exploration since only a small percentage of the existing oil can usually be recovered since the remainder is absorbed in the pores of the sediment. In utilizing the method of this invention it is possible to predict with accuracy the location of the area of least porosity, which is the area in which free oil is most likely to be located, thus indicating preferred locations for exploration and extraction of oil based upon permeability distribution.

In accordance with this invention, various cross-bore distances may be used. For a 3-meter distance between the bores, for example, a frequency range from about 1 to 10 kHz is preferred. At 1 kHz it is possible to propagate effective wave energy through a distance of about 100 to 200 meters through the sediment. In some cases, as a practical matter, it is desirable to utilize a spacing between the cross-bores of 100 meters or more, utilizing frequencies of about 1 to 10 kHz, preferably about 1 to 5 kHz.

It is important in accordance with this invention, instead of utilizing a vertical seismic profile having only a single borehole with the source and the receiver in the same borehole, to utilize spaced apart boreholes, and to measure across from one hole to another, as described. We refer to this new technique, in an abbreviated manner, as cross-hole tomography, and have found it very effective in checking spacial inhomogeneities in the sediment.

In accordance with one embodiment of this invention, tests may be conducted utilizing acoustic transmission with a single tip sparker of low frequency (1 to 3 kHz), using a piezo electric acoustic transducer as the source, and with hydrophones comprising the receivers, positioned along the surface of the sedimentary deposit and extending down through a separate borehole spaced apart from the borehole containing the single tip sparker. As one example the spaced apart bores may extend about 4 meters into the sedimentary material and may be bored in a generally vertical direction. They may be spaced apart from each other, for example at about 3 meters, and direct transmission may be instituted from the single tip sparker to all of the hydrophones, measuring the signatures from each hydrophone in a manner to measure compressional wave velocity and specific attenuation between the boreholes. Specific attenuation measurements may be made by using the spectral ratio method, and the compressional wave velocity and specific attenuation may be readily calculated from the phase spectra and transfer function. In this manner, cross-hole tomography is used to check spacial inhomogeneities.

Accordingly, in this invention, acoustic pulse transfers are conducted in sedimentary materials, and are discovered to reveal compressional wave velocities that are dispersive, especially in certain frequency ranges where specific attenuation is at a maximum. Porosity and permeability are readily estimated, using the aforementioned Biot theory, from the compressional wave velocity and the specific attenuation, all as described in detail in our aforesaid report in J. Acous. Soc. Am. 87 (6) Jun. 1990, the disclosure of which is incorporated herein by reference.

Figure 1:
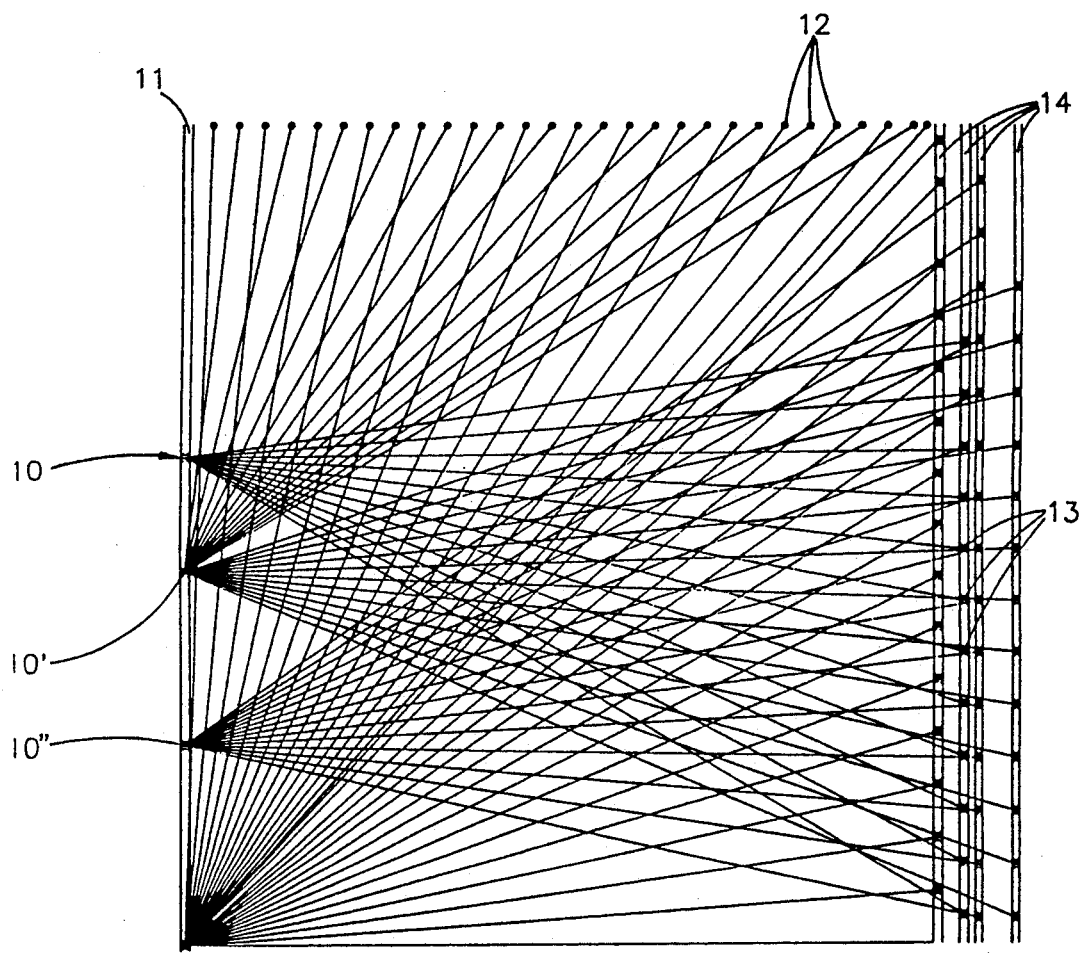
FIG. 1 is a schematic diagram, shown as indicating a vertical section through the sediment, illustrating one particular embodiment of the invention, including source and receiver locations for acoustic tomography.

Turning now to the drawings, FIG. 1 is a diagram showing of a source 10 located in a borehole 11, serving as a propagator for the acoustic tomography measurements. The number 12 indicates a multiplicity of spaced apart hydrophones along the sedimentary surface, while the number 13 designates a multiplicity of hydrophones vertically spaced apart from each other in the vertically extending borehole 14. Boreholes 14, 11 are spaced apart from each other for a distance such as 3.0 meters as shown in the figure, and the boreholes themselves may be, for example, 3.0 meters deep and parallel to each other. Accordingly, measurements are made preferably simultaneously at a wide variety of different angles in regard to wave energy propagated by the source, and all of such measurements are based upon direct propagation from the source 10 to the receivers 12, 13 (hydrophones) and are not based upon the necessity for echoes or other phenomena within the sediment.

Assuming a multiplicity of measurements are taken with the transducer 10 at the location $10^1$, the transducer may then be lowered to another location $10''$ and the measurement process repeated. Still further measurements may be taken at a variety of other locations within the transducer borehole 11, without the need to move any of the hydrophones 12, 13.

Figure 2:
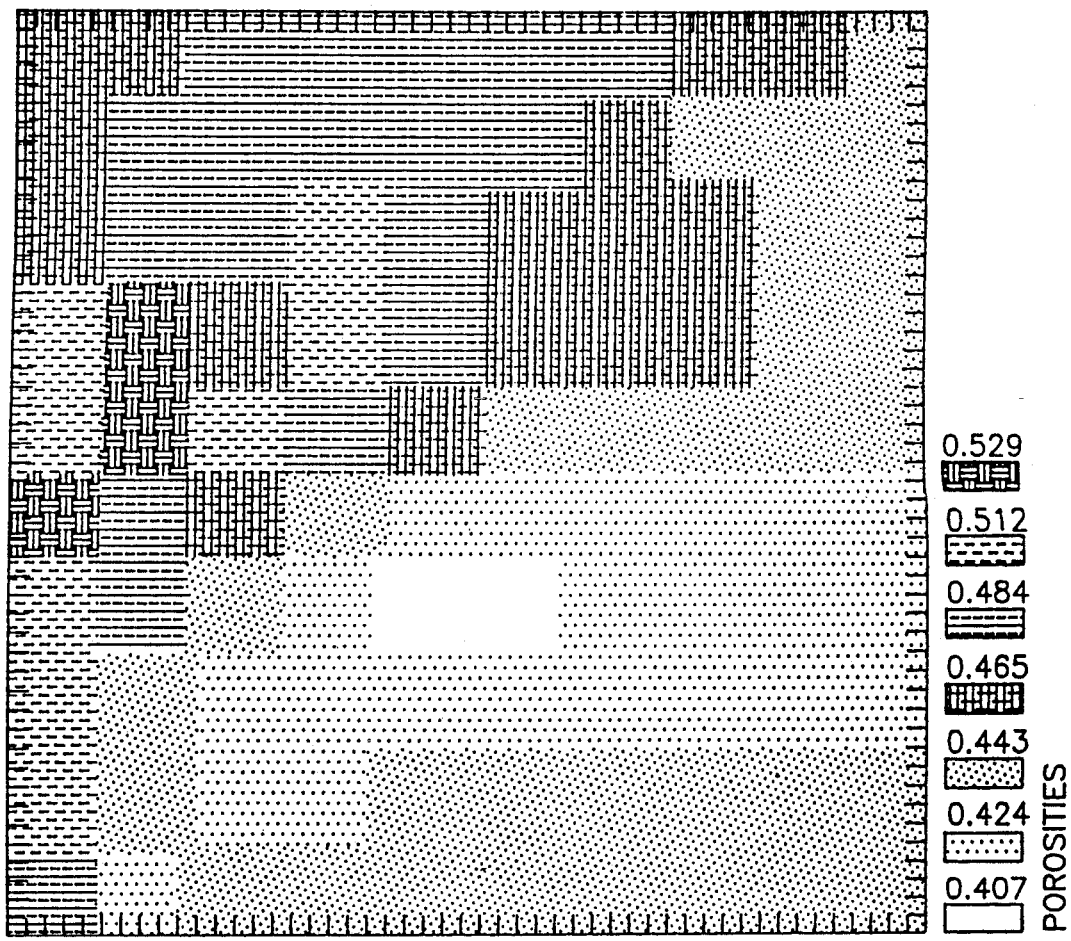
FIG. 2 is a view, also taken as a section through the sediment, showing porosity variations of the sedimentary material in the location subjected to acoustic tomography in accordance with FIG. 1.

FIG. 2 shows a typical porosity variation of the sediment as determined by the tests conducted as in FIG. 1. Accurate acoustic transmission measurements of compressional wave velocity and intrinsic attenuation have been achieved.

Figure 3:
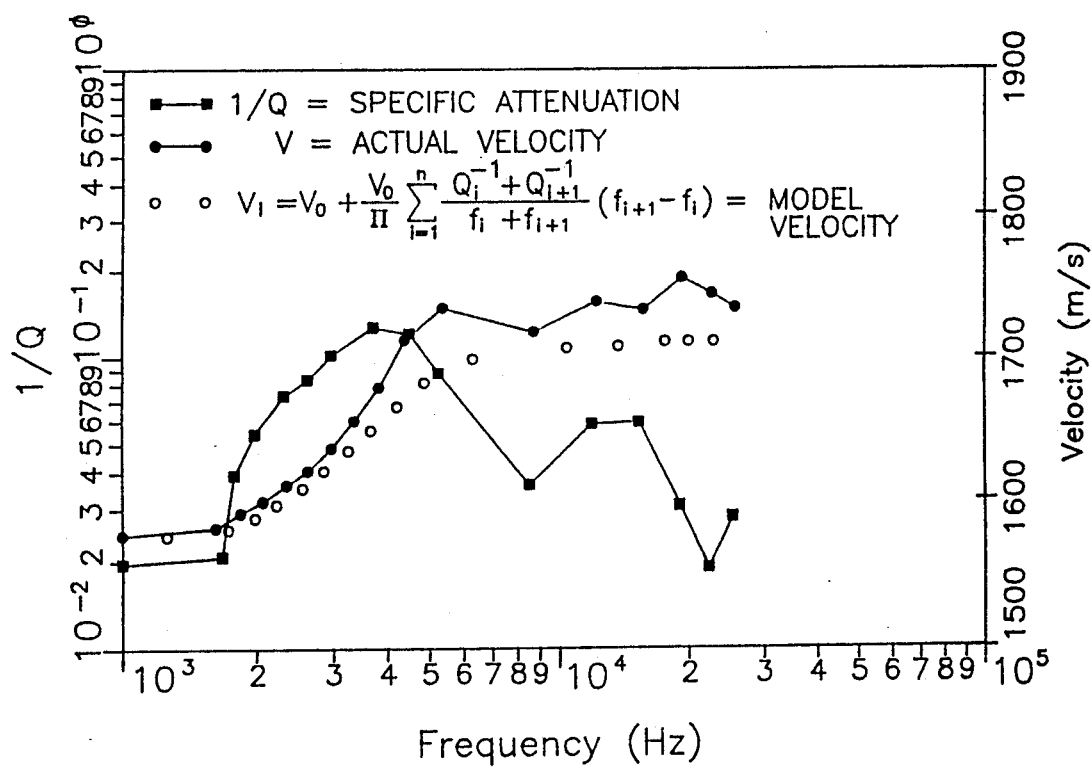
FIG. 3 is a graph showing the relationship between specific attenuation, actual velocity and frequency of the seismic energy, in accordance with this invention.

FIG. 3 is a graph plotting specific attenuation and actual velocity against source frequency in a specific series of tests, and shows the data obtained by placing the source and receivers in the lower right region of the vertical plane where spacial inhomogeneities were minor.

As is shown in FIG. 3, the frequency-dependent intrinsic attenuation and corresponding dispersion in the compressional wave velocity were detected by conducting the experiments in a rather homogenous medium. The porosity and permeability as calculated from acoustic measurements compared favorably with direct core sample measurements. Consistency between predicted and directly measured porosity and permeability indicates that the viscous loss mechanism has a major effect on attenuation in the frequency range of 1 to 30 kHz for sandy sediments. In this frequency band, linearity and causality of the viscous relaxation have been demonstrated by the consistency of measured compressional wave velocity and intrinsic attenuation.

As is shown in FIGS. 4(a) and 4(b), we have surprisingly discovered from actual seismic traces that by using a single-tip sparker as a source in the aforementioned cross-bore hole tomography not only a compressional wave but also a shear wave is generated. Accordingly, from a knowledge of shear wave velocity, shear wave velocity distribution within the sedimentary formation may be measured accurately, and we can further determine shear modulus and shear strength of the sediments. These are important for construction engineering purposes and for accurate determination of existence of hydrocarbons such as oil and gas.

FIGS. 4(a) and 4(b) show evidence of this discovery. Shear wave velocity values directly determine the shear modulus and the shear strength values of the sediments. Knowledge of shear wave velocity values in addition to compressional wave velocity values provides important information of existence or non-existence of hydrocarbons such as oil and gas within the sedimentary formation.

Although this invention has been described with reference to a multiplicity of particular embodiments, it will be appreciated that many variations may be resorted to without departing from the spirit and scope of this invention. For example, more than two boreholes may be used for cross-hole tomography in accordance with this invention, and many relative positions and variations of positions as between the source and the receiver may be resorted to, so long as the respective positions are known. Further, although determination and calculation of characteristics such as porosity, permeability, shear modulus and shear strength may be arrived at by the use of various theories and equations, other analytical methods may be utilized as long as they are based upon the results of the method in accordance with this invention, wherein a source of seismic energy is located in a borehole, wherein a plurality of hydrophones are placed within another borehole spaced away from the source, wherein the source is activated to transmit seismic energy to the hydrophones, and measurements are made directly between the source and the receiver.

We claim:

1. In a non-destructive method of measuring physical characteristics of sediments the steps which comprise:
   (a) forming at least a pair of boreholes spaced apart from each other at a predetermined distance, said boreholes extending at least to known depths from a predetermined sediment surface, said boreholes having entries,
   (b) placing a plurality of hydrophones spaced at predetermined known positions substantially along said sediment surface between said borehole entries,
   (c) placing a multiplicity of hydrophones spaced apart from one another at known positions within at least one of said boreholes,
   (d) placing a source of seismic energy into another of said boreholes at a known position with respect to said hydrophones,
   (e) activating said source to transmit seismic wave energy from said source to said hydrophones,
   (f) measuring seismic wave characteristics of said wave energy in a multiplicity of paths extending from the position of said source to the positions of said hydrophones wherein said measured seismic wave characteristics are selected from the group consisting of:
      (i) compressional wave velocity,
      (ii) compressional wave velocity with frequency change,
      (iii) specific attenuation,
      (iv) specific attenuation with frequency change,
      (v) compressional wave velocity and specific attenuation, both with frequency change,
      (vi) shear wave velocity,
      (vii) shear wave velocity with frequency change,
      (viii) shear wave velocity and specific attenuation, both with frequency changes,
      (ix) actual velocity,
      (x) actual velocity with frequency change,
      (xi) actual velocity and specific attenuation, both with frequency change, and
      (xii) actual velocity, compressional wave velocity, specific attentuation and shear wave velocity, all with frequency change,
   (g) moving the source of seismic energy relative to said hydrophones, and
   (h) activating said source and making further seismic wave characteristics measurements in a multiplicity of paths extending to said hydrophones each time the seismic source is repositioned wherein said measured seismic wave characteristics are selected from the group consisting of:
      (i) compressional wave velocity,
      (ii) compressional wave velocity with frequency change,
      (iii) specific attenuation,
      (iv) specific attenuation with frequency change,
      (v) compressional wave velocity and specific attenuation, both with frequency change,
      (vi) shear wave velocity,
      (vii) shear wave velocity with frequency change,
      (viii) shear wave velocity and specific attenuation, both with frequency change,
      (ix) actual velocity,
      (x) actual velocity with frequency change,
      (xi) actual velocity and specific attenuation, both with frequency change, and
      (xii) actual velocity, compressional wave velocity, specific attenuation and shear wave velocity, all with frequency change.

2. The method defined in claim 1, wherein said source of seismic energy is a piezo electric ceramic transducer.

3. The method defined in claim 2, wherein said transducer is a single-tip sparker.

4. The method defined in claim 1 wherein the transmitted seismic wave energy has a frequency of 1–1000 kHz.

5. The method defined in claim 1 wherein said boreholes are substantially parallel to each other.

6. The method defined in claim 5 wherein said boreholes are substantially vertical.

7. The method defined in claim 6 wherein the respective boreholes are about 3 meters apart.

8. The method defined in claim 1 wherein said boreholes are of substantially equal depth.

9. The method defined in claim 1 wherein said hydrophones are substantially equally spaced.

10. The method defined in claim 1 wherein said measuring step comprises measurement of specific attenuation and velocity of said transmitted seismic wave energy.

11. The method defined in claim 1 wherein the seismic wave energy is propagated at a frequency of about 1–3 kHz.

12. The method of claim 1 wherein a combination of said measured actual velocity, attenuation and source frequency is measured to determine porosity and permeability.

13. The method of claim 1 wherein a combination of compressional wave velocity and frequency-dependent attenuation is measured to determine porosity and permeability.

14. The method of claim 1 wherein shear velocity is measured to determine shear strength and shear modulus.

15. The method of claim 1 wherein a multiplicity of boreholes are spaced apart from each other at predetermined distances, said boreholes having entries and extending to known depths from a predetermined sediment surface, wherein a plurality of hydrophones are placed at predetermined known positions in said multiplicity of boreholes.

16. The method of claim 15 wherein a plurality of hydrophones are spaced at equal distances from each other in each borehole.

* * * * *

UNITED STATES PATENT AND TRADEMARK OFFICE
CERTIFICATE OF CORRECTION

PATENT NO. : 5,142,500
DATED : August 25, 1992
INVENTOR(S) : Tokuo Yamamoto et al It is certified that error appears in the above-indentified patent and that said Letters Patent is hereby corrected as shown below:

In Column 1, line 5, please insert --This invention was made with U.S. Government support under Grant No. N00014-89-J-1146 awarded by the Department of the Navy. The Government has certain rights to the invention.--

Signed and Sealed this

Twenty-fourth Day of January, 1995

Attest:

BRUCE LEHMAN

Attesting Officer

Commissioner of Patents and Trademarks